US008406826B2

(12) United States Patent
Moran et al.

(10) Patent No.: US 8,406,826 B2
(45) Date of Patent: Mar. 26, 2013

(54) FOLDABLE MOBILE PHONE

(75) Inventors: Dov Moran, Kfar Saba (IL); Eyal Bychkov, Hod Hasharon (IL); Itay Sherman, Hod Hasharon (IL); Uri Ron, Tel Aviv (IL)

(73) Assignee: Google Inc., Mountain View, CA (US)

( * ) Notice: Subject to any disclaimer, the term of this patent is extended or adjusted under 35 U.S.C. 154(b) by 721 days.

(21) Appl. No.: 12/615,454

(22) Filed: Nov. 10, 2009

(65) Prior Publication Data

US 2010/0120468 A1 May 13, 2010

Related U.S. Application Data

(60) Provisional application No. 61/113,262, filed on Nov. 11, 2008.

(51) Int. Cl.
*H04M 1/00* (2006.01)
(52) U.S. Cl. .................................. 455/575.1; 455/566
(58) Field of Classification Search .......... 455/550.1, 455/556.1, 566, 575.1, 575.3, 575.4, 575.8, 455/90.3
See application file for complete search history.

(56) References Cited

U.S. PATENT DOCUMENTS

| 5,625,673 | A | 4/1997 | Grewe et al. |
| 5,628,055 | A | 5/1997 | Stein |
| 5,809,115 | A | 9/1998 | Inkinen |
| 5,893,037 | A | 4/1999 | Reele et al. |
| 5,907,815 | A | 5/1999 | Grimm et al. |
| 6,188,917 | B1 | 2/2001 | Laureanti |
| 6,201,867 | B1 | 3/2001 | Koike |
| 6,243,578 | B1 | 6/2001 | Koike |
| 6,477,357 | B1 | 11/2002 | Cook |
| 6,516,202 | B1 | 2/2003 | Hawkins et al. |
| 6,640,113 | B1 | 10/2003 | Shim et al. |
| 6,690,947 | B1 | 2/2004 | Tom |
| 6,898,283 | B2 | 5/2005 | Wycherley et al. |
| 6,907,264 | B1 | 6/2005 | Sterkel |
| 6,999,792 | B2 | 2/2006 | Warren |
| 7,085,542 | B2 | 8/2006 | Dietrich et al. |
| 7,149,557 | B2 * | 12/2006 | Chadha .................... 455/575.1 |
| 7,194,285 | B2 | 3/2007 | Tom |

(Continued)

FOREIGN PATENT DOCUMENTS

| EP | 1871075 A1 | 12/2007 |
| WO | 9421058 A1 | 9/1994 |

(Continued)

*Primary Examiner* — Ping Hsieh
(74) *Attorney, Agent, or Firm* — Soquel Group LLC

(57) ABSTRACT

A mobile phone, including a modular communicator including a modem for transmitting and receiving voice and data communications, a communicator connector for making electrical connection with a jacket for the communicator, when the jacket is pouched in the communicator, a communicator display screen for displaying information, and a communicator controller (i) for executing programmed instructions for operating the modem, (ii) for transmitting data to and receiving data from the communicator connector, and (iii) for generating the information displayed on the communicator display screen, and a jacket for the modular communicator, including a mechanical jacket housing including a top section and a bottom section connected by a hinge which enables the top section to fold over the bottom section, a pouch including a cavity into which the communicator may be pouched, and a transparent portion through which at least a portion of the communicator display shows when the communicator is pouched in the jacket and when the top section is folded over the bottom section, a jacket connector that mates with the communicator connector to make electrical connection with the communicator, when the communicator is pouched in the jacket, and a jacket controller for transmitting data to and receiving data from the communicator controller, via the jacket connector.

23 Claims, 10 Drawing Sheets

U.S. PATENT DOCUMENTS

| | | |
|---|---|---|
| 7,266,391 B2 | 9/2007 | Warren |
| 7,463,247 B2 | 12/2008 | Berry |
| 7,477,919 B2 | 1/2009 | Warren |
| 7,515,937 B2 | 4/2009 | Lee |
| 8,175,656 B2 * | 5/2012 | Beith ............................ 455/567 |
| 2002/0090980 A1 | 7/2002 | Wilcox et al. |
| 2002/0151327 A1 | 10/2002 | Levitt |
| 2004/0233930 A1 | 11/2004 | Colby, Jr. |
| 2004/0268005 A1 | 12/2004 | Dickie |
| 2005/0020327 A1 * | 1/2005 | Chung et al. ............... 455/575.3 |
| 2005/0159184 A1 | 7/2005 | Kerner et al. |
| 2006/0003804 A1 | 1/2006 | Liu |
| 2006/0105722 A1 | 5/2006 | Kumar |
| 2006/0190321 A1 | 8/2006 | Martins Nicho et al. |
| 2006/0241353 A1 | 10/2006 | Makino et al. |
| 2007/0004450 A1 | 1/2007 | Parikh |
| 2007/0018957 A1 | 1/2007 | Seo |
| 2007/0079030 A1 | 4/2007 | Okuley et al. |
| 2007/0161404 A1 | 7/2007 | Yasujima et al. |
| 2007/0288583 A1 | 12/2007 | Rensin et al. |
| 2008/0009325 A1 | 1/2008 | Zinn et al. |
| 2008/0040354 A1 | 2/2008 | Ray et al. |
| 2008/0140886 A1 | 6/2008 | Izutsu |
| 2009/0111540 A1 * | 4/2009 | Inoue et al. ................. 455/575.3 |

FOREIGN PATENT DOCUMENTS

| | | |
|---|---|---|
| WO | 0059247 A1 | 10/2000 |
| WO | 0186922 A1 | 11/2001 |
| WO | 03103174 A1 | 12/2003 |

* cited by examiner

FOLDABLE MOBILE PHONE

CROSS REFERENCES TO RELATED APPLICATIONS

This application claims benefit of U.S. Provisional Application No. 61/113,262, entitled FOLDABLE MOBILE PHONE, filed on Nov. 11, 2008 by inventors Dov Moran, Eyal Bychkov, Itay Sherman and Uri Ron.

FIELD OF THE INVENTION

The present invention relates to housings and user interfaces for mobile phones.

BACKGROUND OF THE INVENTION

Mobile phones are manufactured in a variety of form factors. There are bar-shaped mobile phones, slider mobile phones that swivel, and flip mobile phones, referred to as "clamshells", that have generally two, but possibly more, sections that fold via a hinge. A "hinge" refers to a bearing that connects two solid objects, generally allowing only a limited angle of rotation between them. Hinges may be made of flexible material or of moving components.

The user interface of a clamshell phone is generally distributed over its two or more sections. When a clamshell phone is open, its user interface is fully exposed and accessible. When a clamshell phone is closed, the phone is not fully functional.

Many mobile phone manufacturers, such as Motorola, Inc. of Schaumburg, Ill., place a secondary screen on the rear side of the top section of a clamshell phone, which displays information to the user when the clamshell is closed. Information displayed on the secondary screen may include inter alia a date & time, a number of missed calls, incoming messages and battery status.

In this regard, reference is now made to FIG. 1, which is an illustration of a prior art clamshell phone with a primary display screen in the clamshell's open position and a secondary display in the clamshell's closed position. Such prior art clamshell phones offer great advantage in displaying information to a user while the phone is closed. However, a drawback with such prior art clamshell phones is the additional space required by the secondary display and the ensuing additional cost.

It would thus be of advantage to produce a more space and cost efficient clamshell phone with primary and secondary displays.

SUMMARY OF THE DESCRIPTION

Aspects of the present invention provide efficiently produced foldable clamshell phones with reduced space and cost requirements vis a vis prior art phones.

In one embodiment, the present invention involves a modular communicator and a jacket device. The modular communicator inserts inside a cavity of the jacket. When inserted, the modular communicator provides the jacket with wireless modem capability, and the jacket provides the modular communicator with an enhanced user interface. The modular communicator and the jacket each have their own display screens. When the modular communicator is inserted into the jacket, the communicator's display screen shows through an opening of the jacket casing, or through a transparent portion of the jacket casing.

The invention is applicable and advantageous to a variety of mobile phone form factors, including inter alia foldable mobile phones, bar-shaped mobile phones and slider mobile phones.

There is thus provided in accordance with an embodiment of the present invention a mobile phone, including a modular communicator including a modem for transmitting and receiving voice and data communications, a communicator connector for making electrical connection with a jacket for the communicator, when the jacket is pouched in the communicator, a communicator display screen for displaying information, and a communicator controller (i) for executing programmed instructions for operating the modem, (ii) for transmitting data to and receiving data from the communicator connector, and (iii) for generating the information displayed on the communicator display screen, and a jacket for the modular communicator, including a mechanical jacket housing including a top section and a bottom section connected by a hinge which enables the top section to fold over the bottom section, a pouch including a cavity into which the communicator may be pouched, and a transparent portion through which at least a portion of the communicator display shows when the communicator is pouched in the jacket and when the top section is folded over the bottom section, a jacket connector that mates with the communicator connector to make electrical connection with the communicator, when the communicator is pouched in the jacket, and a jacket controller for transmitting data to and receiving data from the communicator controller, via the jacket connector.

There is additionally provided in accordance with an embodiment of the present invention a mobile phone, including a modular communicator including a modem for transmitting and receiving voice and data communications, a communicator connector for making electrical connection with a jacket for the communicator, when the jacket is pouched in the communicator, a communicator display screen for displaying information, and a communicator controller (i) for executing programmed instructions for operating the modem, (ii) for transmitting data to and receiving data from the communicator connector, and (iii) for generating the information displayed on the communicator display screen, and a jacket for the modular communicator, including a mechanical jacket housing including a pouch including a cavity into which the communicator may be pouched, a transparent portion through which at least a portion of the communicator display shows when the communicator is pouched in the jacket, and a jacket display screen for displaying a graphical user interface, the graphical user interface being generated by the jacket controller, a jacket connector that mates with the communicator connector to make electrical connection with the communicator, when the communicator is pouched in the jacket, and a jacket controller for transmitting data to and receiving data from the communicator controller, via the jacket connector.

There is further provided in accordance with an embodiment of the present invention a mobile phone, including a modular communicator including a modem for transmitting and receiving voice and data communications, a communicator connector for making electrical connection with a jacket for the communicator, when the jacket is pouched in the communicator, a communicator display screen for displaying information, and a communicator controller (i) for executing programmed instructions for operating the modem, (ii) for transmitting data to and receiving data from the communicator connector, and (iii) for generating the information displayed on the communicator display screen, and a jacket for the modular communicator, including a mechanical jacket housing including a front layer and a back layer coupled by a sliding mechanism that opens and closes the jacket housing by respectively raising and lowing the front layer relative to the back layer, a pouch comprising a cavity into which the communicator may be pouched, and a transparent portion through which at least a portion of the communicator display shows when the communicator is pouched in the jacket and when the jacket housing is open, a jacket connector that mates with the communicator connector to make electrical connection with the communicator, when the communicator is pouched in the jacket, and a jacket controller for transmitting data to and receiving data from the communicator controller, via the jacket connector.

BRIEF DESCRIPTION OF THE DRAWINGS

The present invention will be more fully understood and appreciated from the following detailed description, taken in conjunction with the drawings in which.

DETAILED DESCRIPTION

Aspects of the present invention relate to foldable mobile phones.

In some embodiments, the present invention relates to a modular wireless communicator that may be coupled with a "jacket" in a manner referred to herein as "pouching". A jacket is defined herein to mean a device that provides an enhanced user interface for the communicator, enriches the capabilities of the communicator, and is not able to operate independently when the communicator is not connected thereto. Pouching is defined herein to mean inserting the wireless communicator inside of the jacket so that the communicator is at least partially obscured by the jacket, and such that the jacket mechanically supports the communicator when the jacket is held by a user. The wireless communicator may be operated as a standalone device, or in conjunction with the jacket when pouched therein.

Figure 2:
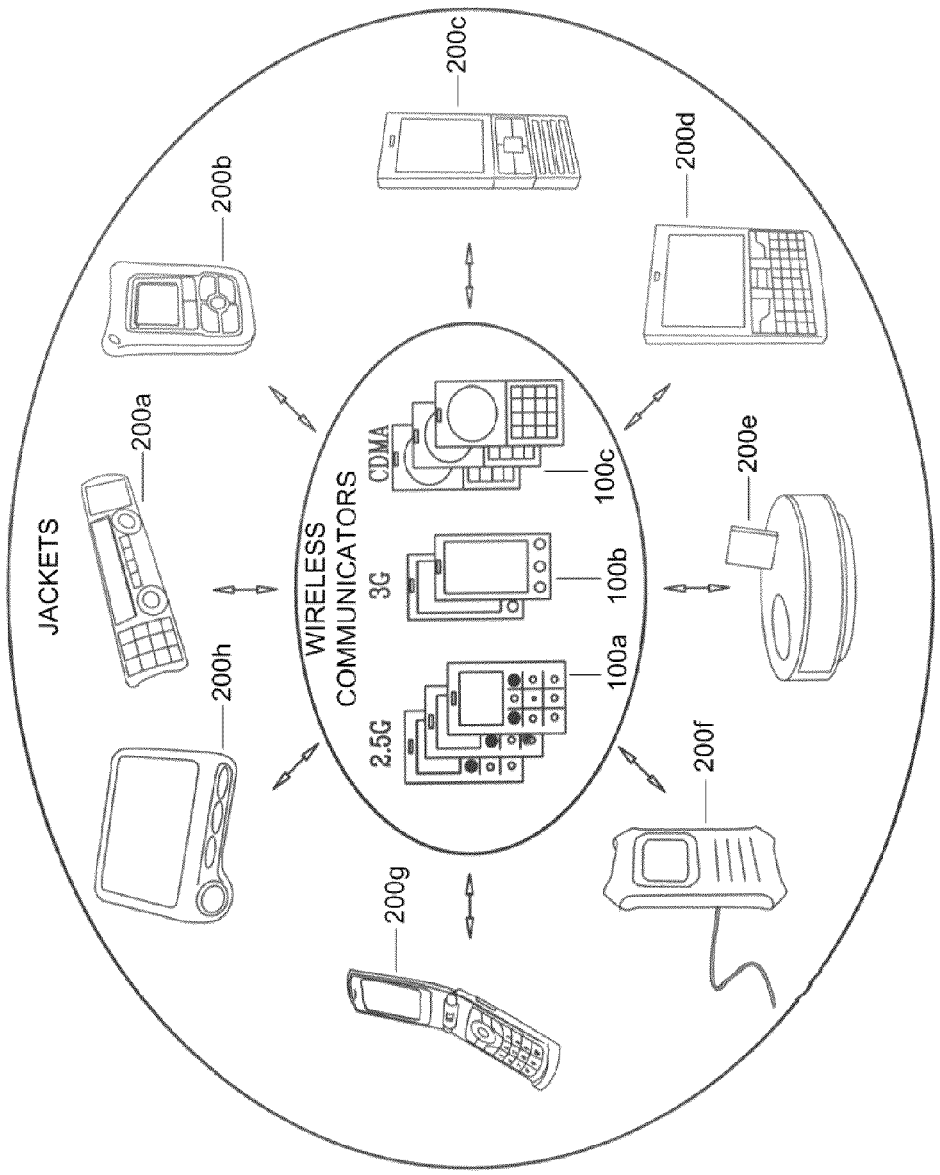
FIG. 2 is an illustration of a communication system constructed and operative in accordance with an embodiment of the present invention.

Reference is now made to FIG. 2, which is an illustration of a communication system constructed and operative in accordance with an embodiment of the present invention. Shown in FIG. 2 are a plurality of modular wireless communicators 100*a*-100*c*, including 2.5 G communicators for a GSM network, 3G communicators for a GSM network, and CDMA communicators for a CDMA network. It will be appreciated by those skilled in the art that the networks illustrated in FIG. 2 are exemplary of a wide variety of networks and communication protocols that are supported by the communicators of the present invention, such networks and communication protocols including inter alia WiFi, Bluetooth and WiMax.

Also shown in FIG. 2 is a plurality of jackets 200*a*-200*h*. In accordance with an embodiment of the present invention, each communicator 100*a*-100*c* may be pouched in any of jackets 200*a*-200*h*, so as to operate in combination therewith. Communicators 100*a*-100*c* are substantially of the same form factor and, as such, are able to be pouched in each of jackets 200*a*-200*h*.

Figure 3:
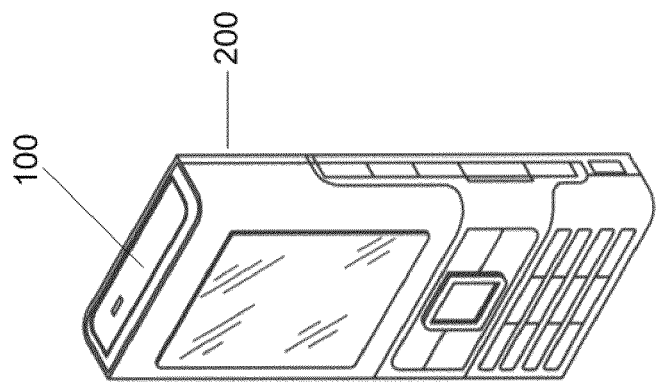
FIG. 3 is an illustration of a modular communicator being inserted into a jacket, in accordance with an embodiment of the present invention.
Figure 3:
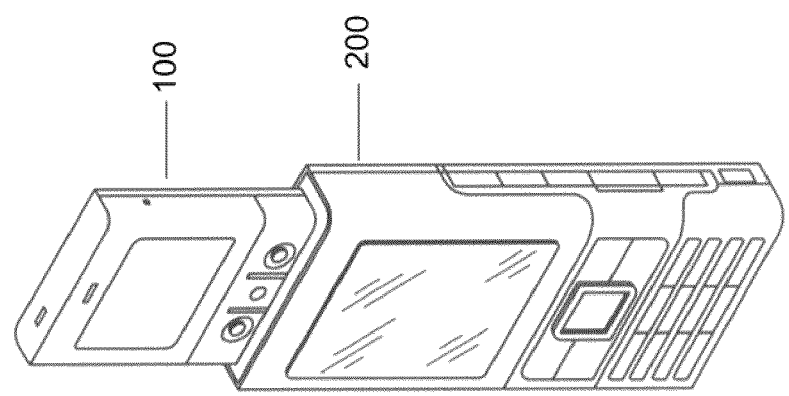
Figure 3:
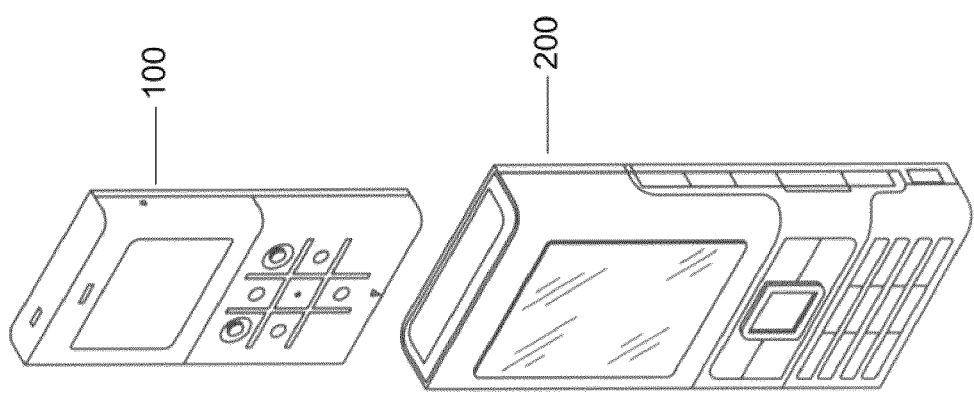

Reference is further made to FIG. 3, which is an illustration of a modular wireless communicator 100 being pouched in a jacket 200, in accordance with an embodiment of the present invention. Jacket 200 as shown in FIG. 3 includes a hollow cavity at the top for pouching of communicator 100 therein.

Figure 4:
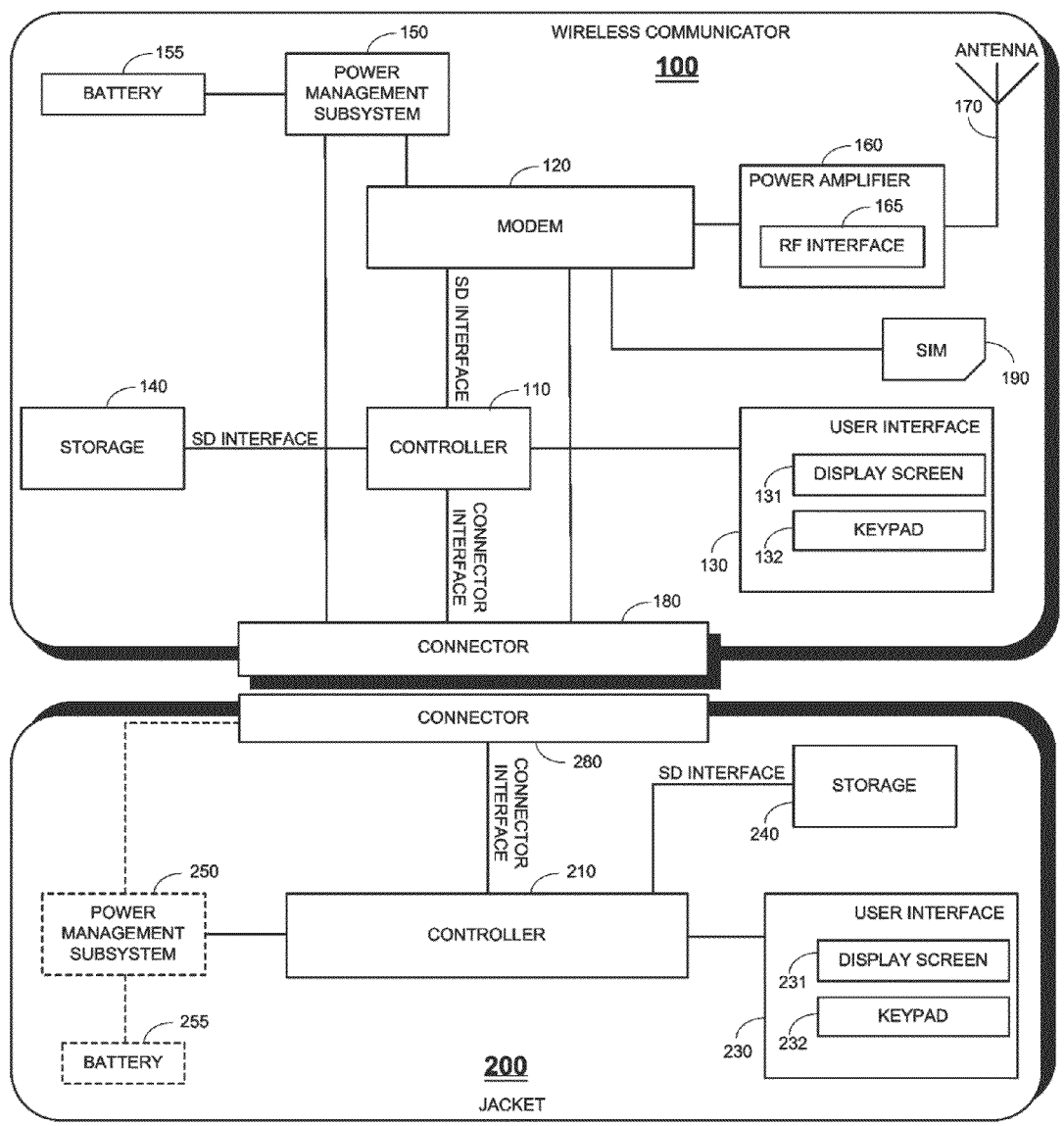
FIG. 4 is a simplified block diagram of a modular communicator and a jacket in accordance with an embodiment of the present invention.

Reference is now made to FIG. 4, which is a simplified block diagram of communicator 100 and jacket 200 in accordance with an embodiment of the present invention. Communicator 100 includes nine primary components, as follows: a controller 110, a modem 120 for sending and receiving voice and data, a user interface 130, a memory storage 140, a power management subsystem 150, a power amplifier 160, an antenna 170, a connector 180 for connecting the communicator to jacket 200 when the communicator is pouched in jacket 200, and a subscriber identification module (SIM) 190.

Controller 110 executes programmed instructions that control the data flow between communicator 100 and jacket 200. Modem 120 controls the communication functionality of communicator 100. User interface 130 includes a display screen 131 and a keypad 132. User interface 130 may optionally include additional components (not shown) such as a microphone, a headset audio jack, an earpiece, a mono speaker or stereo speakers, and a vibrator.

Power management subsystem 150 includes charging circuitry for charging a battery 155. Power amplifier 160 includes a radio frequency (RF) interface 165, and is connected to antenna 170.

In accordance with an embodiment of the present invention, the interface between controller 110 and storage 140, and the interface between controller 110 and modem 120 are both SD interfaces. The interface between controller 110 and connector 180 is a custom interface.

Jacket 200 includes four primary components, as follows: a controller 210, a user interface 230, a memory storage 240, and a connector 280 for connecting the jacket to communicator 100 when communicator 100 is pouched in the jacket. Jacket 200 may include an optional power management subsystem 250 and an optional battery 255.

User interface 230 includes a display screen 231 and a keypad 232. User interface 230 may optionally include additional components (not shown), such as a microphone, a headset audio jack, an earpiece, a mono speaker or stereo speakers, and a vibrator.

In accordance with an embodiment of the present invention, the interface between controller 210 and storage 240 is an SD interface. The interface between controller 210 and connector 280 is a custom interface.

Figure 5:
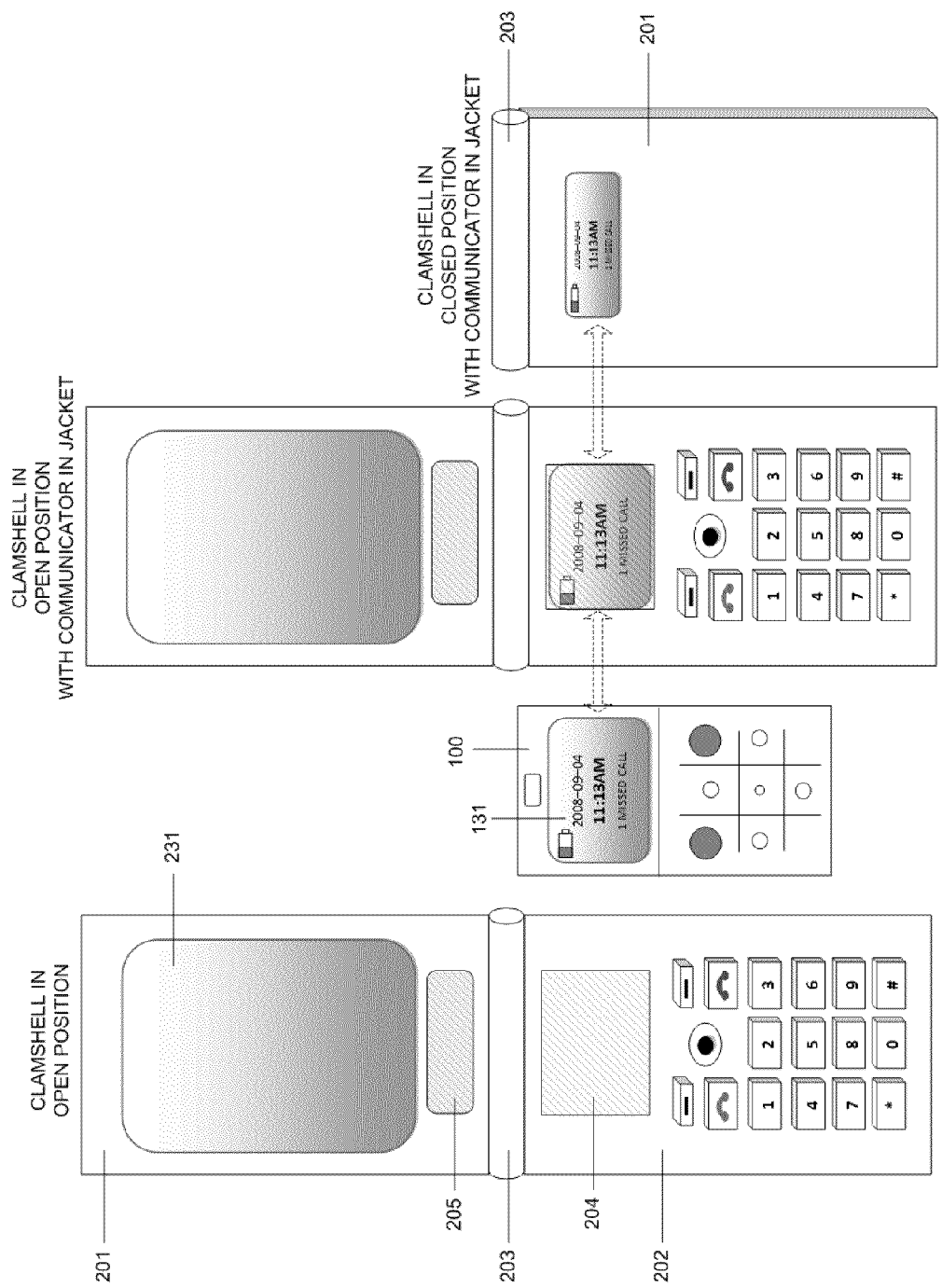
FIG. 5 is an illustration of a clamshell mobile phone with a primary display screen in the open position and a secondary display in the closed position, in accordance with a first embodiment of the present invention.

Reference is now made to FIG. 5, which is an illustration of a clamshell mobile phone with a primary display screen in the open position and a secondary display in the closed position, in accordance with a first embodiment of the present invention. The mobile phone has a top section 201 and a bottom section 202 connected by a hinge 203, which enables top section 201 to be folded over bottom section 202 when the clamshell is closed.

In the embodiment shown in FIG. 5, communicator 100 is pouched in bottom section 202. Bottom section 202 has a portion 204 through which at least a portion of screen 131 shows, when communicator 100 is pouched in bottom section 202. Portion 204 may be a partially transparent surface portion of bottom section 202, or an opening in the surface of bottom section 202. Moreover, top section 201 has a portion 205 that is positioned such that at least a portion of screen 131 shows through portion 205, when communicator 100 is pouched in bottom section 202 and top section 201 is folded over bottom section 202. Portion 205 may be a partially transparent surface portion of top section 201, or an opening in the surface of top section 201.

It will thus be appreciated by those skilled in the art that information on display screen 131 is visible when the clamshell phone of FIG. 5 is closed. As shown in FIG. 5, such information may include inter alia a date & time, an indicator of one or more missed calls, and a battery status for battery 155 (FIG. 4).

Figure 6:
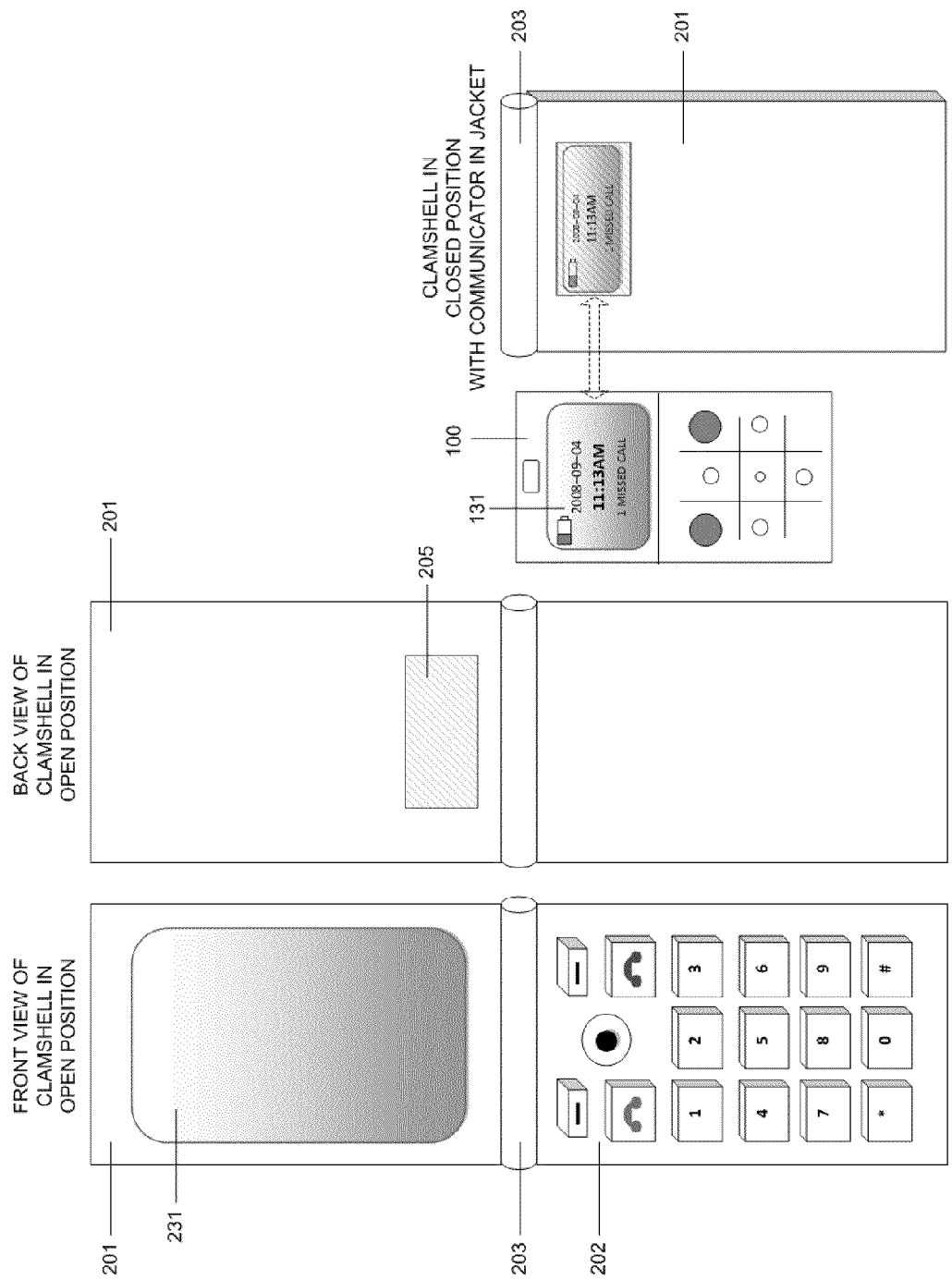
FIG. 6 is an illustration of a clamshell mobile phone with a primary display screen in the open position and a secondary display in the closed position, in accordance with a second embodiment of the present invention.

Reference is now made to FIG. 6, which is an illustration of a clamshell mobile phone with a primary display screen in the open position and a secondary display in the closed position, in accordance with a second embodiment of the present invention. The mobile phone has a top section 201 and a bottom section 202 connected by a hinge 203, which enables top section 201 to be folded over bottom section 202 when the clamshell is closed.

In the embodiment shown in FIG. 6, communicator 100 is pouched in top section 201. Top section 201 has a portion 205 through which at least a portion of screen 131 shows, when communicator 100 is pouched in top section 201. Portion 205 may be a partially transparent surface portion of top section 201, or an opening in the surface of top section 201.

It will thus be appreciated by those skilled in the art that information on display screen 131 is visible when the clamshell phone of FIG. 6 is closed. As shown in FIG. 6, such information may include inter alia a date & time, an indicator of one or more missed calls, and a battery status for battery 155 (FIG. 4).

Figure 7:
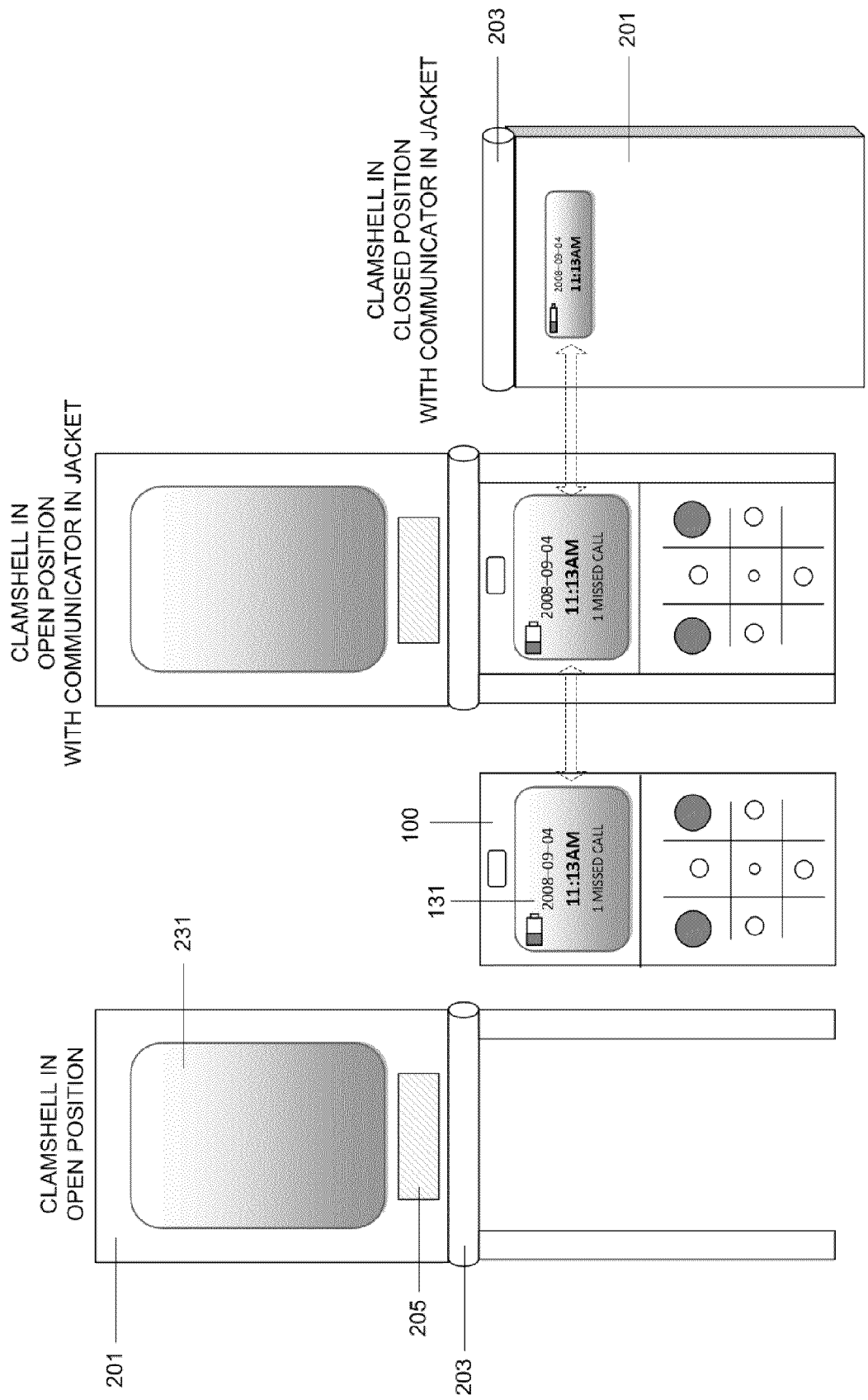
FIG. 7 is an illustration of a clamshell mobile phone with a display screen that shows through a jacket cover, in accordance with a third embodiment of the present invention.

Reference is now made to FIG. 7, which is an illustration of a clamshell mobile phone with a display screen that shows through a jacket cover, in accordance with a third embodiment of the present invention. In this embodiment, the bottom section of jacket 200 includes sliding guides for communicator 100 to slide into place so that connectors 180 and 280 (FIG. 4) are mated. The mobile phone has a top section 201 connected by a hinge 203, which enables top section 201 to be folded over the sliding guides.

Top section 201 has a portion 205 through which at least a portion of screen 131 shows, when communicator 100 is slid into place and the clamshell is closed. Portion 205 may be a partially transparent surface portion of top section 201, or an opening in the surface of top section 201.

Figure 1:
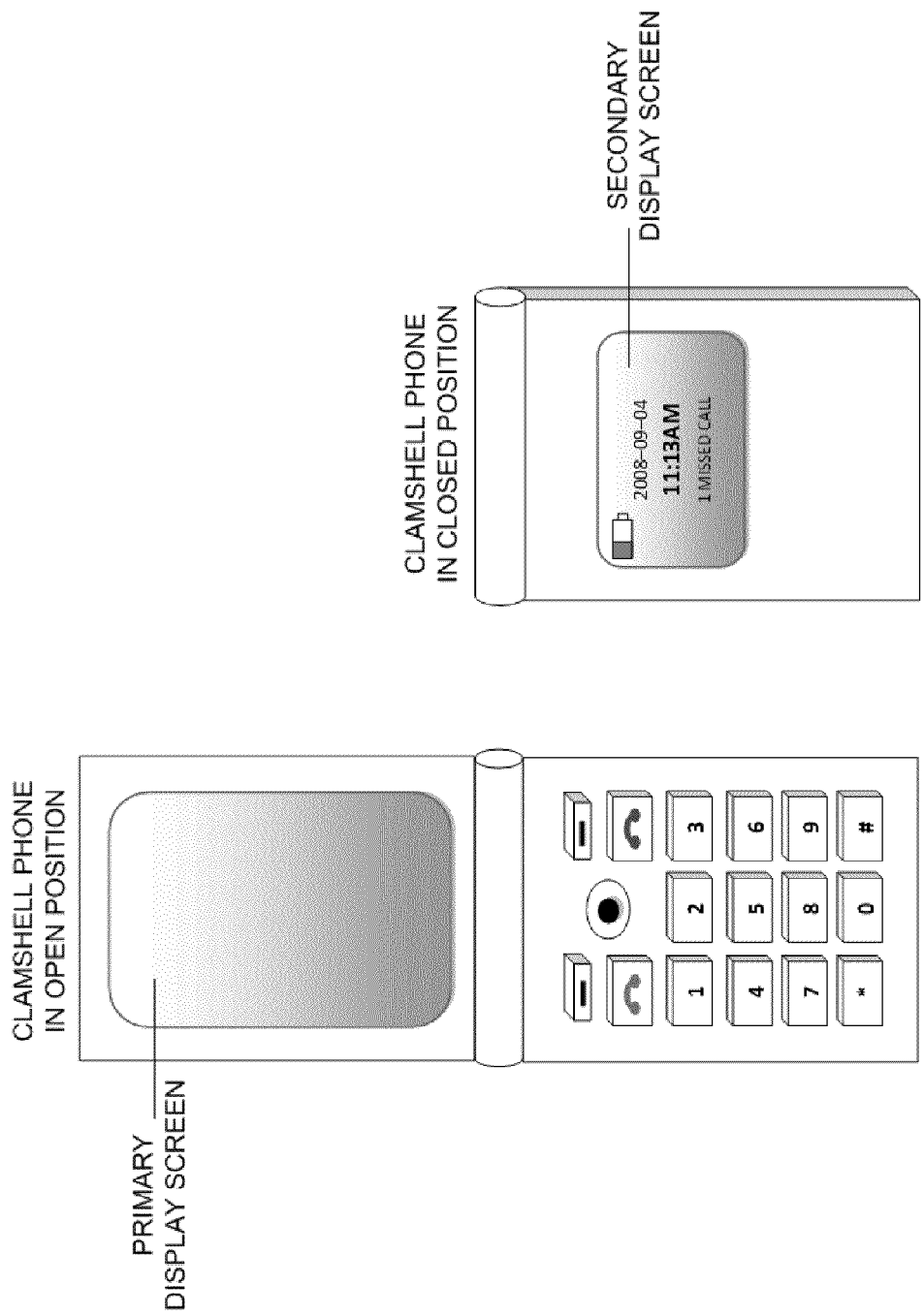
FIG. 1 is an illustration of a prior art clamshell mobile phone with a primary display screen in the open position and a secondary display in the closed position.

The embodiments shown in FIG. 5-7 are efficient foldable mobile phone with reduced space and cost requirements vis a vis prior art foldable phones, such as the phone shown in FIG. 1.

In reading the above description, persons skilled in the art will realize that there are many apparent variations that can be applied to the embodiments described. Thus it will be appreciated that the present invention applies to foldable mobile phones with more than two sections, such as a three-section foldable, wherein a top and a bottom section fold over a middle section to close the phone.

Figure 8:
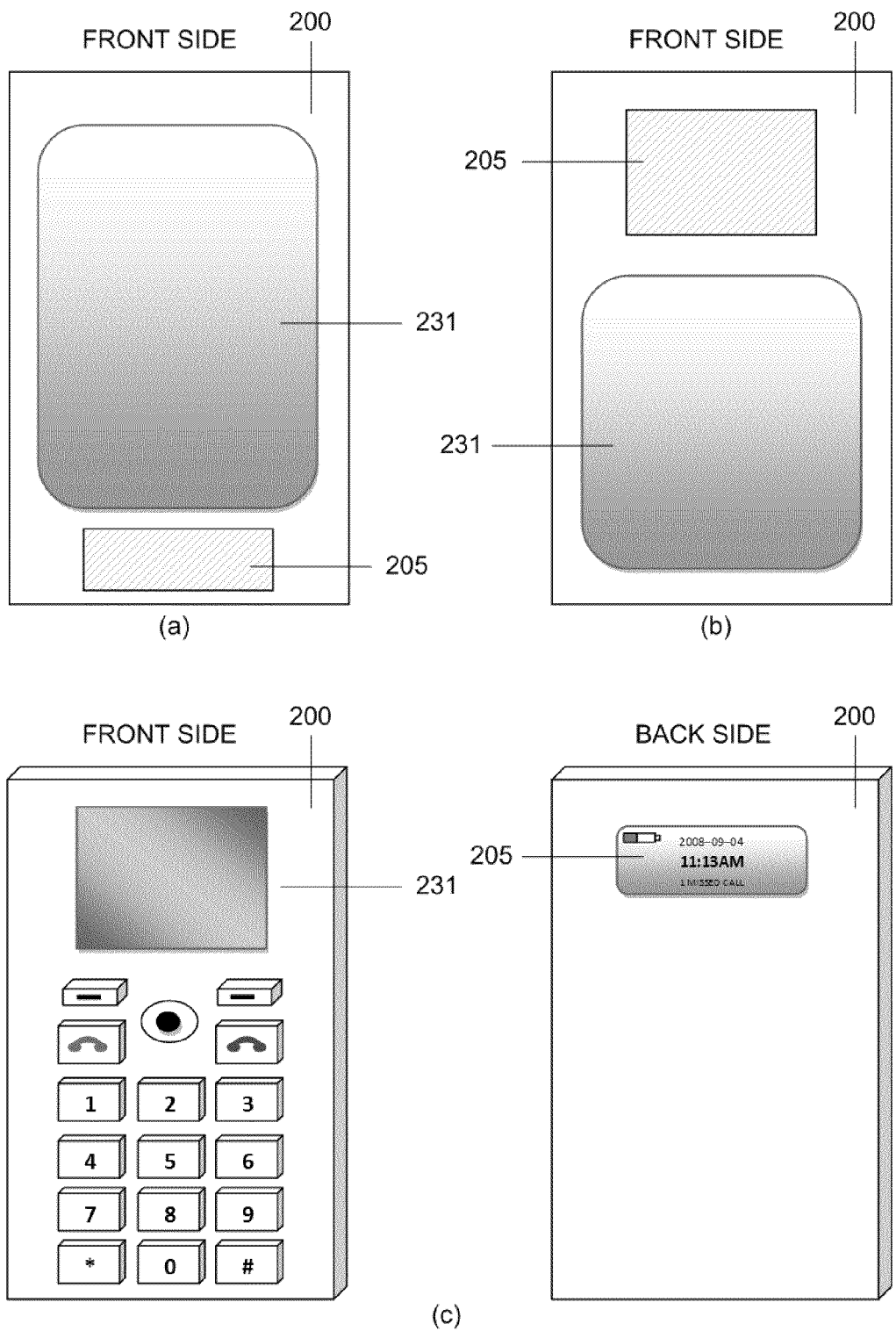
FIG. 8 is an illustration of a bar-shaped mobile phone with a display screen that shows through a jacket cover, in accordance with an embodiment of the present invention.

It will further be appreciated that the present invention also applies to non-foldable mobile phones, including inter alia bar-shaped phones and slider phones. Reference is made to FIG. 8, which is an illustration of a bar-shaped mobile phone with a display screen that shows through a jacket cover, in accordance with an embodiment of the present invention. The jacket 200 shown in FIG. 8 has a bar form factor, and includes jacket screen 231 and a portion 205 through which at least a portion of communicator screen 131 shows, when communicator 100 is pouched in jacket 200.

Three configurations are shown in FIG. 8; namely, (a) jacket screen 231 and portion 205 positioned on the front surface of jacket 200, with jacket screen 231 above portion 205; (b) jacket screen 231 and portion 205 positioned on the front surface of jacket 200, with jacket screen 231 below portion 205; and (c) jacket screen 231 positioned on the front surface of jacket 200, and portion 205 positioned on the back surface of jacket 200.

Figure 9:
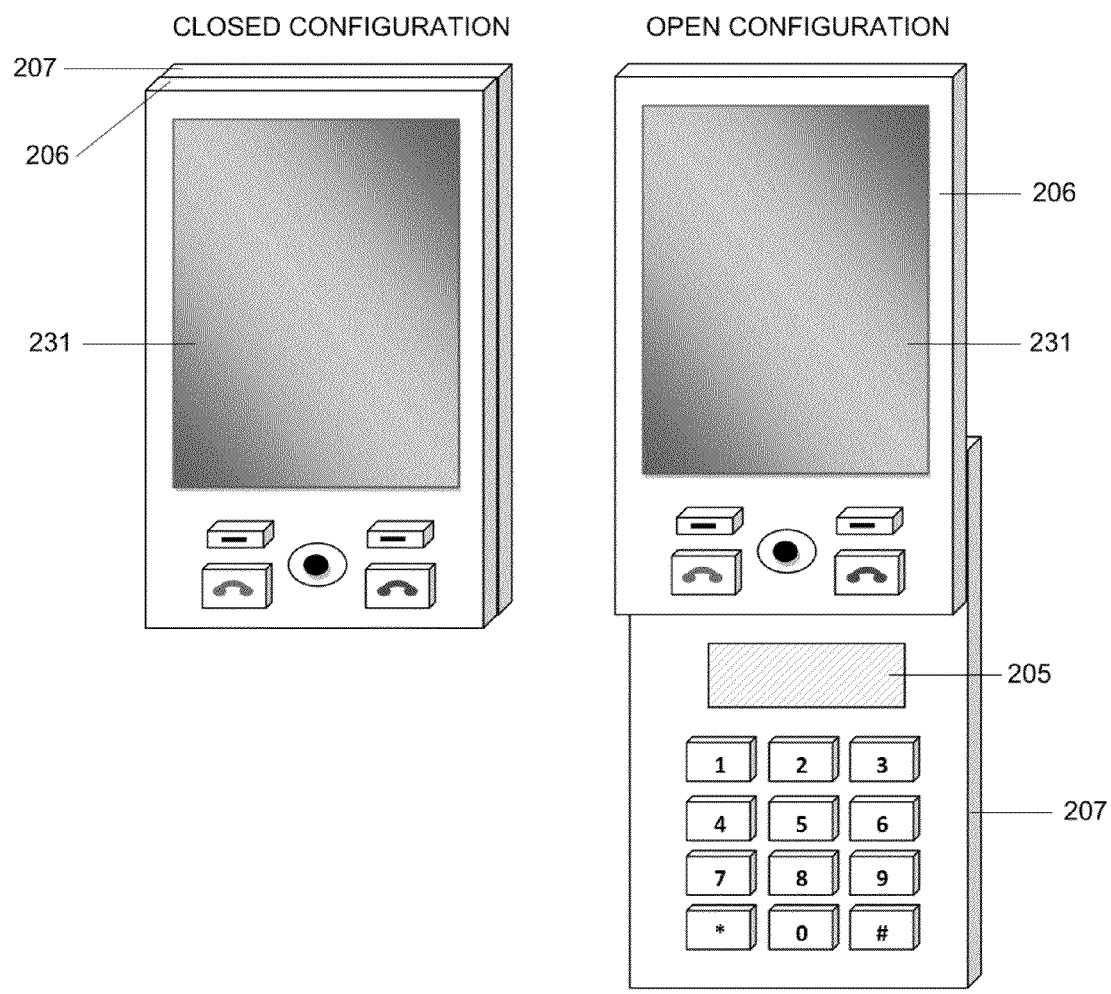
FIG. 9 is an illustration of a slider mobile phone with a display screen that shows through a jacket cover, in accordance with a first embodiment of the present invention.

Reference is made to FIG. 9, which is an illustration of a slider mobile phone with a display screen that shows through a jacket cover, in accordance with a first embodiment of the present invention. The jacket 200 shown in FIG. 9 has a slider form factor, and includes jacket screen 231 and a portion 205 through which at least a portion of communicator screen 131 shows, when communicator 100 is pouched in jacket 200. Jacket 200 has a front layer 206 and a back layer 207, which slide up and down relative to one another to open and close the jacket housing. Jacket screen 231 is positioned on front layer 206, and portion 205 is positioned on a surface of back layer 207 that is concealed when jacket 200 is closed.

Figure 10:
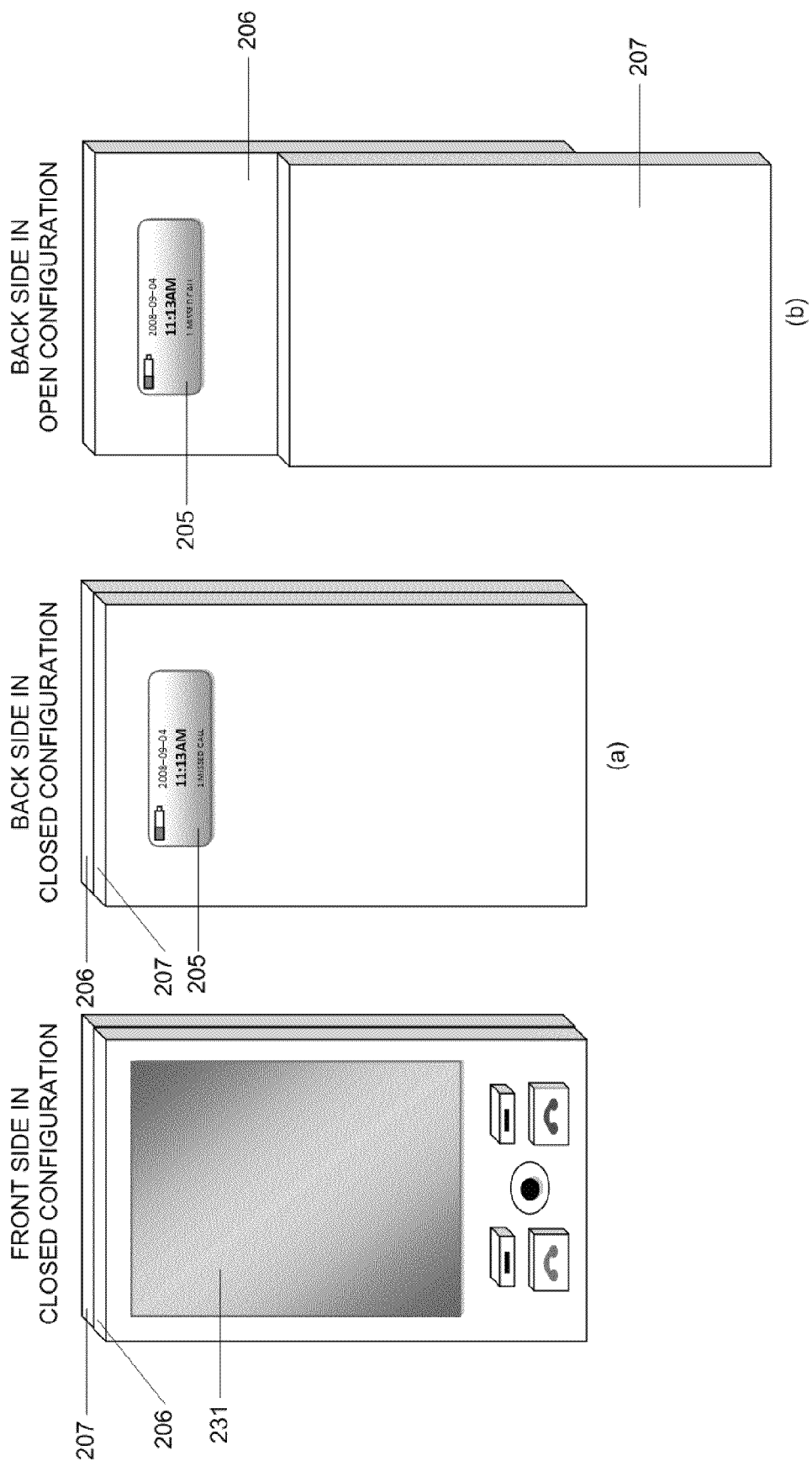
FIG. 10 is an illustration of a slider mobile phone with a display screen that shows through a jacket cover, in accordance with a second embodiment of the present invention.

Reference is made to FIG. 10, which is an illustration of a slider mobile phone with a display screen that shows through a jacket cover, in accordance with a second embodiment of the present invention. The jacket 200 shown in FIG. 10 also has a front layer 206 and a back layer 207, which slide up and down relative to one another to open and close the jacket. Jacket screen 231 is positioned on front layer 206. Two configurations are shown for portion 205; namely, (a) portion 205 positioned on back layer 207 of jacket 200, and (b) portion 205 positioned on a surface of front layer 206 that is concealed when the jacket is closed.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:
1. A mobile phone, comprising:
  a modular communicator comprising:
    a modem for transmitting and receiving voice and data communications;
    a communicator connector for making electrical connection with a jacket for the communicator, when the communicator is pouched in the jacket;
    a communicator display screen for displaying information; and a communicator controller (i) for executing programmed instructions for operating said modem, (ii) for transmitting data to and receiving data from said communicator connector, and (iii) for generating the information displayed on said communicator display screen; and a jacket for said modular communicator, comprising:
  a mechanical jacket housing comprising:
    a top section and a bottom section connected by a hinge which enables the top section to fold over at least a portion of the bottom section;
    a pouch comprising a cavity into which said communicator may be pouched;
    a transparent portion through which at least a portion of said communicator display shows through to the outside of the jacket when said communicator is pouched in the jacket and when said top section is folded over said bottom section; and
    a jacket display screen for displaying a graphical user interface, wherein the jacket display screen does not overlap said transparent portion when said top section is folded over said bottom section;
  a jacket connector that mates with said communicator connector to make electrical connection with said communicator, when said communicator is pouched in the jacket; and
  a jacket controller for transmitting data to and receiving data from said communicator controller, via said jacket connector, and for generating the graphical user interface displayed on said jacket display screen.

2. The mobile phone of claim 1 wherein said pouch is positioned in said top section of said jacket housing, and wherein said transparent portion of said housing is a partially transparent surface portion of said top section of said jacket housing.

3. The mobile phone of claim 1 wherein said pouch is positioned in said top section of said jacket housing, and wherein said transparent portion of said housing is an opening in a surface of said top section of said jacket housing.

4. The mobile phone of claim 1 wherein said pouch is positioned in said bottom section of said jacket housing, wherein said transparent portion of said housing is a partially transparent surface portion of said bottom section of said jacket housing.

5. The mobile phone of claim 1 wherein said pouch is positioned in said bottom section of said jacket housing, and wherein said transparent portion of said housing is an opening in a surface of said bottom section of said jacket housing.

6. The mobile phone of claim 1 wherein said pouch is positioned in said bottom section of said jacket housing, wherein said transparent portion of said housing is a partially transparent surface portion of said bottom section of said jacket housing, and wherein said top section of said jacket housing comprises a partially transparent surface portion through which at least a portion of said communicator display shows through to the outside of the jacket when said communicator is pouched in said jacket and when said top section is folded over said bottom section.

7. The mobile phone of claim 1 wherein said pouch is positioned in said bottom section of said jacket housing, wherein said transparent portion of said housing is a partially transparent surface portion of said bottom section of said jacket housing, and wherein said top section of said jacket housing comprises an opening through which at least a portion of said communicator display shows through to the outside of the jacket when said communicator is pouched in said jacket and when said top section is folded over said bottom section.

8. The mobile phone of claim 1 wherein said pouch is positioned in said bottom section of said jacket housing, wherein said transparent portion of said housing is an opening in a surface portion of said bottom section of said jacket housing, and wherein said top section of said jacket housing comprises a partially transparent surface portion through which at least a portion of said communicator display shows through to the outside of the jacket when said communicator is pouched in said jacket and when said top section is folded over said bottom section.

9. The mobile phone of claim 1 wherein said pouch is positioned in said bottom section of said jacket housing, wherein said transparent portion of said housing is an opening in a surface portion of said bottom section of said jacket housing, and wherein said top section of said jacket housing comprises an opening through which at least a portion of said communicator display shows through to the outside of the jacket when said communicator is pouched in said jacket and when said top section is folded over said bottom section.

10. The mobile phone of claim 1 wherein said communicator controller generates date and time information for display on said communicator display.

11. The mobile phone of claim 1 wherein said communicator controller generates information regarding missed phone calls for display on said communicator display.

12. The mobile phone of claim 1 wherein said communicator further comprises a battery, and wherein said communicator controller generates information regarding battery status of said battery for display on said communicator display.

13. A mobile phone, comprising:
  a modular communicator comprising:
    a modem for transmitting and receiving voice and data communications;
    a communicator connector for making electrical connection with a jacket for the communicator, when the communicator is pouched in the jacket;
    a communicator display screen for displaying information; and
    a communicator controller (i) for executing programmed instructions for operating said modem, (ii) for transmitting data to and receiving data from said communicator connector, and (iii) for generating the information displayed on said communicator display screen; and
  a jacket for said modular communicator, comprising:
    a mechanical jacket housing comprising:
      a pouch comprising a cavity into which said communicator may be pouched;
      a transparent portion through which at least a portion of said communicator display shows when said communicator is pouched in the jacket; and
      a jacket display screen for displaying a graphical user interface, wherein the jacket display screen does not overlap said transparent portion;
    a jacket connector that mates with said communicator connector to make electrical connection with said communicator, when said communicator is pouched in the jacket; and
    a jacket controller for transmitting data to and receiving data from said communicator controller, via said jacket connector, and for generating the graphical user interface displayed on said jacket display screen.

14. The mobile phone of claim 13 wherein transparent portion of said mechanical jacket housing is a partially transparent surface portion of said mechanical jacket housing.

15. The mobile phone of claim 13 wherein transparent portion of said mechanical jacket housing is an opening in a surface of said mechanical jacket housing.

16. The mobile phone of claim 13 wherein said mechanical jacket housing comprises a front surface and a back surface, and wherein said transparent portion and said jacket display screen are positioned on the front surface of said mechanical housing, with said transparent portion positioned above said jacket display screen.

17. The mobile phone of claim 13 wherein said mechanical jacket housing comprises a front surface and a back surface, and wherein said transparent portion and said jacket display screen are positioned on the front surface of said mechanical housing, with said transparent portion positioned below said jacket display screen.

18. The mobile phone of claim 13 wherein said mechanical jacket housing comprises a front surface and a back surface, and wherein said transparent portion is positioned on the back surface of said mechanical housing, and said jacket display screen is positioned on the front surface of said mechanical housing.

19. A mobile phone, comprising:
 a modular communicator comprising:
  a modem for transmitting and receiving voice and data communications;
  a communicator connector for making electrical connection with a jacket for the communicator, when the communicator is pouched in the jacket;
  a communicator display screen for displaying information; and
  a communicator controller (i) for executing programmed instructions for operating said modem, (ii) for transmitting data to and receiving data from said communicator connector, and (iii) for generating the information displayed on said communicator display screen; and
 a jacket for said modular communicator, comprising:
  a mechanical jacket housing comprising:
   a front layer and a back layer coupled by a sliding mechanism that opens and closes the jacket housing by respectively raising and lowering the front layer relative to the back layer;
   a pouch comprising a cavity into which said communicator may be pouched;
   a transparent portion through which at least a portion of said communicator display shows when said communicator is pouched in the jacket and when said jacket housing is open; and
   a jacket display screen for displaying a graphical user interface;
  a jacket connector that mates with said communicator connector to make electrical connection with said communicator, when said communicator is pouched in the jacket; and
  a jacket controller for transmitting data to and receiving data from said communicator controller, via said jacket connector, and for generating the graphical user interface displayed on said jacket display screen.

20. The mobile phone of claim 19 wherein said transparent portion is positioned on a surface of the front layer that is concealed with the jacket housing is closed.

21. The mobile phone of claim 19 wherein said transparent portion is positioned on a surface of the front layer that is revealed with the jacket housing is closed.

22. The mobile phone of claim 19 wherein said transparent portion is positioned on a surface of the back layer that is concealed with the jacket housing is closed.

23. The mobile phone of claim 19 wherein said transparent portion is positioned on a surface of the back layer that is revealed with the jacket housing is closed.

\* \* \* \* \*